W. J. ADAMS.
FERTILIZER DISTRIBUTER.
APPLICATION FILED AUG. 28, 1908.
927,919.
Patented July 13, 1909.
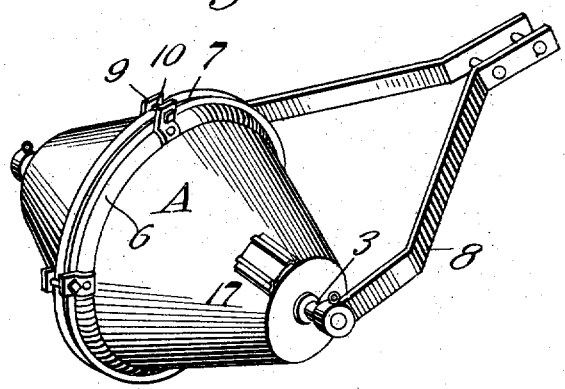
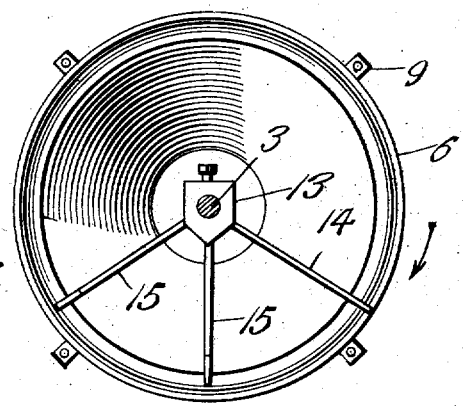
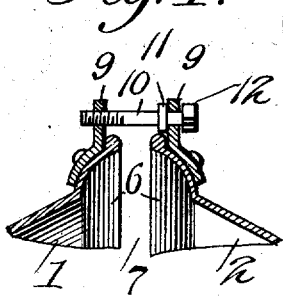
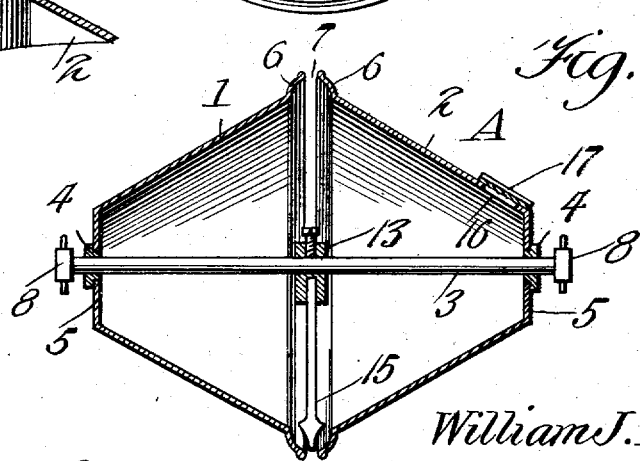
Witnesses
Geo. Ackman Jr.
C. Bradway
Inventor
William J. Adams,
By Victor J. Evans
Attorney

UNITED STATES PATENT OFFICE.

WILLIAM J. ADAMS, OF MOBILE, ALABAMA.

FERTILIZER-DISTRIBUTER.

No. 927,919.  Specification of Letters Patent.  Patented July 13, 1909.

Application filed August 28, 1908. Serial No. 450,686.

*To all whom it may concern:*

Be it known that I, WILLIAM J. ADAMS, a citizen of the United States, residing at Mobile, in the county of Mobile and State of Alabama, have invented new and useful Improvements in Fertilizer-Distributers, of which the following is a specification.

This invention relates to a distributer intended primarily for commercial fertilizer in powder form and intended more especially for distributing the fertilizer in drills or rows.

The invention has for one of its objects to provide a device of this character which is of extremely simple, durable and inexpensive construction, reliable and efficient in use and readily adjusted for controlling the feed of the fertilizer.

Another object of the invention is the provision of a distributer composed of oppositely dished or hollow sections that constitute a holder for the fertilizer and which are suitably spaced apart to form an annular discharge mouth through which the fertilizer is discharged, there being means within the holder for keeping the mouth clean and for insuring the discharge of fertilizer therethrough, and the holder is of such design that it may be used for sowing seed in drills.

With these objects in view and others, as will appear as the description proceeds, the invention comprises the various novel features of construction and arrangement of parts which will be more fully described hereinafter, and particularly pointed out in the claims appended hereto.

In the accompanying drawing which illustrates one of the embodiments of the invention, Figure 1 is a perspective view of the distributer. Fig. 2 is a central transverse section thereof. Fig. 3 is a longitudinal sectional view of the distributer. Fig. 4 is an enlarged fragmentary view of one of the means for adjusting the two parts of the holder for varying the feed of fertilizer.

Similar reference characters are employed to designate corresponding parts throughout the several views.

Referring to the drawing, A designates the holder of the fertilizer which is mounted for rotation and is adapted to run on the ground so as to distribute the fertilizer in a row or drill. The holder is composed of two hollow or dished sections 1 and 2 that are preferably formed out of sheet metal such for instance as galvanized iron of suitable gage and the depth and diameter of each may be varied according to requirements. The sections 1 and 2 are oppositely disposed and mounted to freely rotate on a shaft or axle 3 which passes through fixed bearings 4 on the heads 5 of the sections. The edges of the sections that are presented to each other are formed into peripheral rims 6 that coöperate to form an annular mouth 7 at the center of the holder through which the fertilizer is discharged. To the ends of the shaft 3 is secured a yoke 8 to which a tongue or handle may be connected or by which the distributer may be applied to a plow stock or other instrument whereby the land can be drilled and fertilized in one operation.

The sections 1 and 2 of the holder are provided with outwardly extending ears 9 which are arranged on one section directly opposite to those on the other section and connected with the ears are adjusting bolts 10 whereby the sections can be separated or moved together to vary the width of the discharge mouth or openings 7. As shown in Fig. 4 the bolt 10 is threaded at one end in one of the ears 9 and is free to rotate without longitudinal movement in the other ear, there being a collar 11 on the bolt that coöperates with a head 12 thereon to prevent the bolt from moving longitudinally in the one ear as the bolt is turned. In adjusting the bolt 10 the sections 1 and 2 are free to slide back or forth on the shaft 3. Secured to the middle of the shaft 3 is a block 13 that carries a mouth cleaning device such as an arm 14 that extends forwardly and downwardly and terminates in the mouth to prevent the latter from being clogged with dirt and on the block 13 are one or more vanes 15 which are shorter than the arm 14 but terminate adjacent the mouth for insuring the discharge of fertilizer through the latter. Since the arm 14 extends into the mouth the arm serves to prevent the holder A from working back and forth on the shaft 3 as the device is run over the ground.

In practice the fertilizer is supplied to the holder through a funnel inserted in the opening 16 that is normally closed by a cover 17 and after the required amount has been supplied the opening 16 is closed so that the device will be in condition for use. The holder runs directly on the ground and the mouth 7 discharges the fertilizer in the drill or row. The rims 6 together with the sloping walls of the sections enable the holder to readily roll along in the row without danger of running out at either side. As the holder revolves by contact with the ground the fertilizer in the holder is constantly kept moving so that the mouth 7 will continuously discharge the fertilizer, the mouth being kept free from clogging soil by the device 14. When the land requires heavy fertilizing the sections 1 and 2 are spread apart by adjusting the bolts 10 in the proper direction and when light fertilizing is required the sections are drawn together by the bolt.

From the foregoing description, taken in connection with the accompanying drawing, the advantages of the construction and of the method of operation will be readily apparent to those skilled in the art to which the invention appertains, and while I have described the principle of operation of the invention together with the apparatus which I now consider to be the best embodiment thereof, I desire to have it understood that the apparatus shown is merely illustrative and that such changes may be made when desired as are within the scope of the claims appended hereto.

Having thus described the invention, what is claimed as new is:—

1. In an apparatus of the class described, the combination of a holder consisting of two sections disposed side by side and spaced apart to form an annular mouth and having openings at their outer ends, a fixed shaft extending through the openings and supporting the said sections, means for connecting the sections together at the mouth and serving to vary the opening of the mouth, a block mounted on the shaft at the center thereof, a member secured to the block and extending outwardly into the mouth for keeping the same open and preventing lateral movement of the holder on the shaft, and a depending member on the block disposed in line with the mouth for directing material out of the latter, and a device connected with the shaft for moving the holder.

2. In an apparatus of the class described, the combination of two oppositely-disposed conical sections forming a holder separated by an annular mouth, lugs extending outwardly from the sections at the mouth thereof, adjusting bolts passing through the lugs and spaced outwardly from the mouth, a shaft extending through the sections and on which the holder is mounted, a plurality of members secured to the shaft in the plane of the mouth, one of the members extending outwardly into the mouth and short of the bolts for keeping the mouth clear of soil and preventing lateral movement of the holder on the shaft, and the other member having its outer end terminating adjacent the mouth to discharge material therefrom, and a device connected with the shaft for moving the apparatus.

3. In an apparatus of the class described, the combination of a holder composed of two oppositely disposed sections spaced apart to form an annular discharge mouth, a non-rotatable shaft on which the holder freely rotates, means arranged within the holder and carried by the shaft for keeping the mouth open and serving to prevent lateral movement of the holder on the shaft, and a fixed device within the holder supported on the shaft and located adjacent the bottom of the mouth for directing the material out of the latter.

4. In an apparatus of the class described, the combination of oppositely disposed dished sections forming a holder, means adjustably connecting the sections together in spaced relation to form an annular discharge mouth, a non-rotatable shaft extending through the holder and on which both sections of the latter are movable toward or away from each other to vary the opening of the mouth, a plurality of members mounted on the shaft in the plane of the mouth, one member extending into the mouth for keeping the same open and for maintaining the holder in central position and the other extending short of the mouth to direct the material therethrough, and means connected with the shaft for moving the holder over the ground to rotate the holder by contact with the latter.

In testimony whereof I affix my signature in presence of two witnesses.

WILLIAM J. ADAMS.

Witnesses:
JOHN L. FLETCHER,
C. BRADWAY.